(12) United States Patent
Schmidt

(10) Patent No.: US 10,578,143 B2
(45) Date of Patent: Mar. 3, 2020

(54) RIVET JOINT AND METHOD FOR ITS PRODUCTION

(71) Applicant: Heiko Schmidt, Lappersdorf (DE)

(72) Inventor: Heiko Schmidt, Lappersdorf (DE)

( * ) Notice: Subject to any disclaimer, the term of this patent is extended or adjusted under 35 U.S.C. 154(b) by 669 days.

(21) Appl. No.: 15/008,670

(22) Filed: Jan. 28, 2016

(65) Prior Publication Data

US 2016/0230798 A1 Aug. 11, 2016

(30) Foreign Application Priority Data

Feb. 5, 2015 (DE) .................... 10 2015 101 642

(51) Int. Cl.
| | | |
|---|---|---|
| F16B 13/04 | (2006.01) | |
| F16B 19/10 | (2006.01) | |
| F16B 5/04 | (2006.01) | |
| F16B 37/00 | (2006.01) | |

(52) U.S. Cl.
CPC ............ *F16B 19/1045* (2013.01); *F16B 5/04* (2013.01); *F16B 19/1054* (2013.01); *F16B 19/1072* (2013.01); *F16B 37/00* (2013.01)

(58) Field of Classification Search
CPC .................................................. F16B 19/1072
USPC ......................................................... 411/34
See application file for complete search history.

(56) References Cited

U.S. PATENT DOCUMENTS

| | | | | |
|---|---|---|---|---|
| 633,537 | A * | 9/1899 | Stewart | |
| 3,236,143 | A * | 2/1966 | Wing | .................. F16B 19/1054 411/34 |
| 4,436,467 | A * | 3/1984 | Larsson | .................. F16B 19/04 411/107 |
| 4,906,148 | A * | 3/1990 | Schule | .................. E04D 3/3603 411/34 |
| 5,193,326 | A * | 3/1993 | Sheahan | ............... E04D 3/3601 52/698 |
| 5,199,145 | A * | 4/1993 | McMillan | ............... F16L 41/06 285/197 |
| 5,683,215 | A * | 11/1997 | Gaignard | .............. F16F 1/3732 411/34 |

(Continued)

FOREIGN PATENT DOCUMENTS

| | | |
|---|---|---|
| DE | 29919502 U1 | 3/2001 |
| DE | 202006012493 U1 | 11/2006 |

(Continued)

*Primary Examiner* — Gary W Estremsky
(74) *Attorney, Agent, or Firm* — Welsh Flaxman & Gitler LLC

(57) ABSTRACT

The invention pertains to a rivet joint arrangement (1) comprising a rivet element for producing a rivet joint between at least two workpieces, particularly between at least two sheet metal components, wherein the rivet element features a rivet shaft section (that is at least sectionally realized in the form of a hollow rivet and a rivet flange arranged adjacent thereto along the longitudinal axis (LA) of the rivet element, and wherein the rivet joint is produced by at least sectionally inserting the rivet element into the two preliminary holes in the workpieces, deforming the rivet shaft section into a rivet collar and clamping the two workpieces between the rivet collar and the rivet flange. The rivet flange advantageously is separably connected to the rivet element directly or separably connected to the rivet element via a sleeve element.

18 Claims, 5 Drawing Sheets

(56) References Cited

U.S. PATENT DOCUMENTS

| | | | | |
|---|---|---|---|---|
| 5,737,822 A | * | 4/1998 | Driver | F16L 41/08 |
| | | | | 285/222 |
| 5,915,901 A | * | 6/1999 | Aasgaard | B29C 65/602 |
| | | | | 411/107 |
| 5,947,667 A | * | 9/1999 | Cassatt | F16B 19/1063 |
| | | | | 411/34 |
| 6,537,004 B2 | * | 3/2003 | Cosenza | F16B 5/02 |
| | | | | 411/286 |
| 6,796,759 B2 | | 9/2004 | Aasgaard | |
| 7,713,011 B2 | * | 5/2010 | Orszagh | F16B 37/064 |
| | | | | 411/113 |
| 8,066,465 B2 | * | 11/2011 | Figge | F16B 5/025 |
| | | | | 411/34 |

FOREIGN PATENT DOCUMENTS

| | | |
|---|---|---|
| FR | 2990366 A1 | 11/2013 |
| GB | 1222633 A | 2/1971 |
| WO | WO94/01687 | 1/1994 |
| WO | WO2008/141653 A1 | 11/2008 |

\* cited by examiner

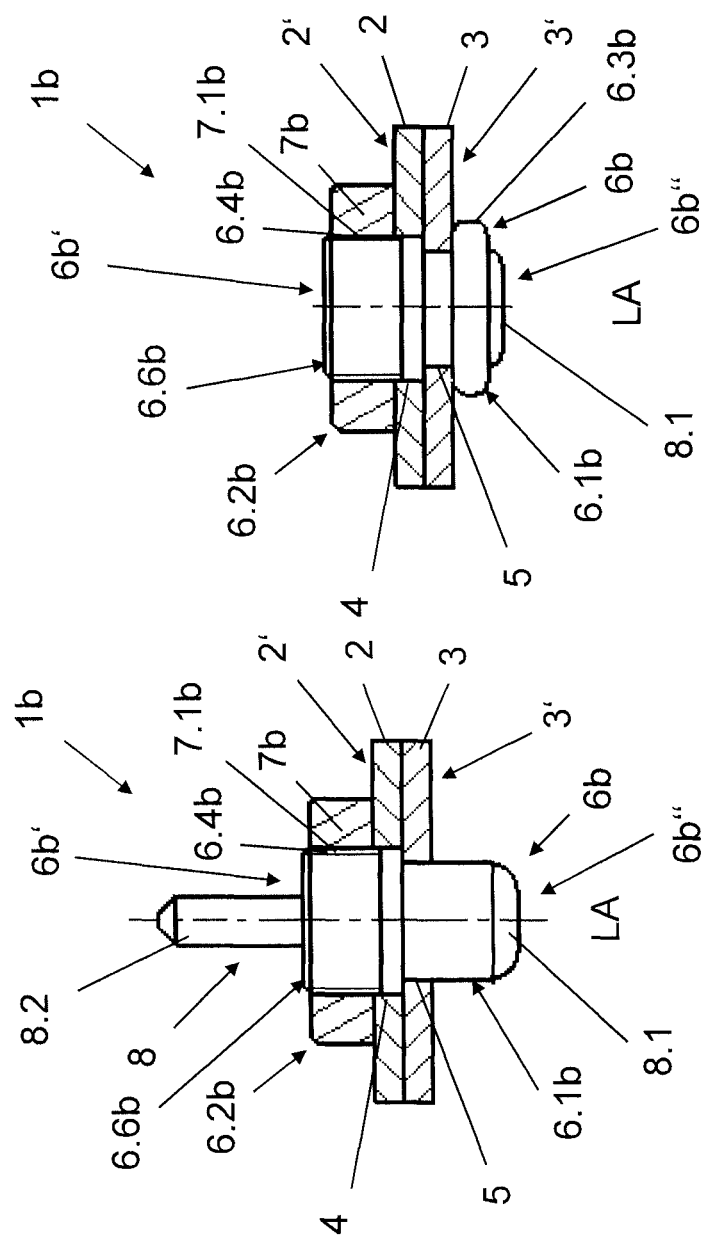

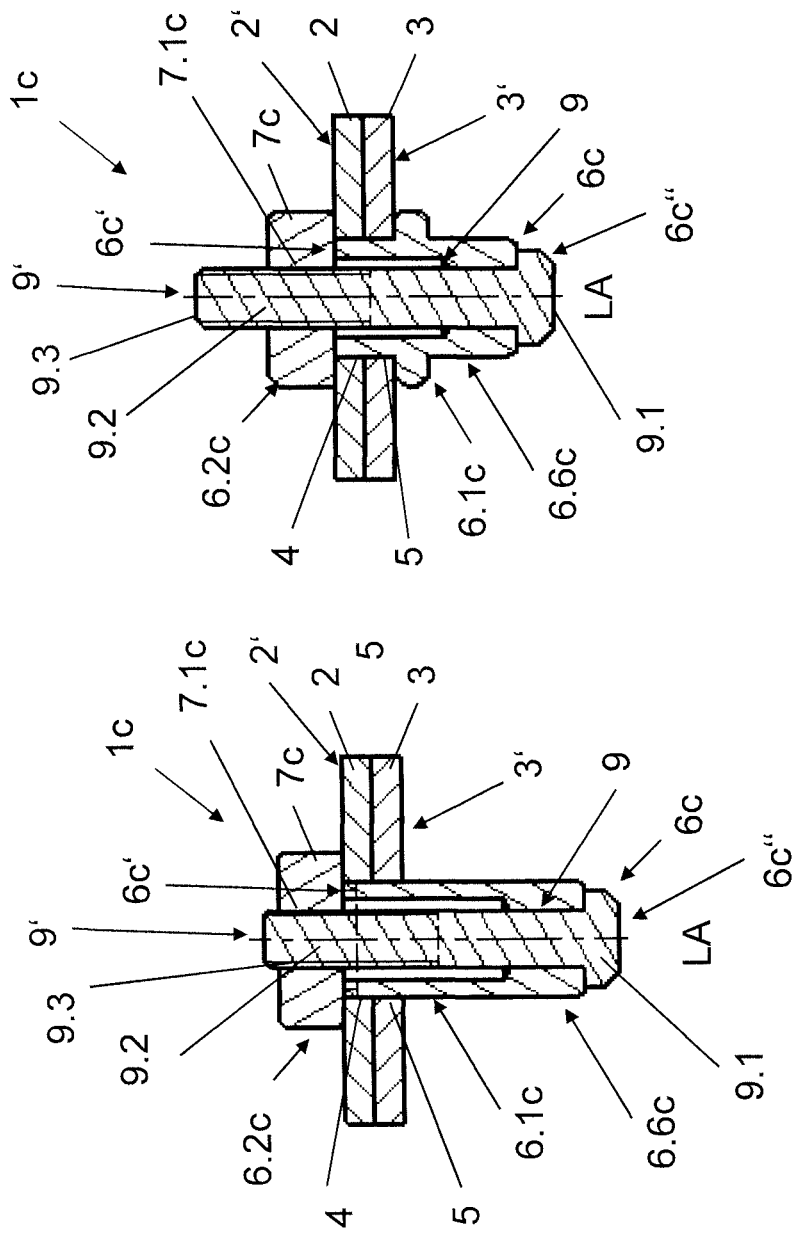

RIVET JOINT AND METHOD FOR ITS PRODUCTION

FIELD OF THE INVENTION

The invention pertains to a rivet joint arrangement using a rivet element for producing a rivet joint between at least two workpieces, and more particularly between at least two sheet metal components, as well as to a corresponding method for its production.

BACKGROUND OF THE INVENTION

Various blind riveting methods and corresponding rivet joint arrangements are sufficiently known. In order to produce a blind rivet joint, for example, between two workpieces of sheet metal or one workpiece of sheet metal and another workpiece, preliminary holes are initially produced in the workpieces to be connected to one another in this case. Subsequently, a blind rivet element featuring at least one rivet sleeve section and one rivet flange section is inserted into the preliminary holes of the workpieces. A tension element in the form of a riveting mandrel or tension mandrel is accommodated in the blind rivet element and preferably features a predetermined breaking point. The rivet joint is produced by acting upon the tension element with a tensile force and thereby pulling the tension element out of the blind rivet element. The tension element in the form of a riveting mandrel features a riveting mandrel head that is arranged adjacent to the rivet sleeve section and supported on the end face of the rivet sleeve section. When the riveting mandrel is pulled out of the blind rivet element, its rivet sleeve section is deformed, preferably until the riveting mandrel element breaks at a predetermined breaking point. In this way, the rivet sleeve section forms a rivet collar such that the workpieces to be connected are clamped between the rivet flange section and the rivet collar. The part of the riveting mandrel featuring the riveting mandrel head preferably remains in the deformed blind rivet element and forms the rivet joint. The rivet collar particularly also fixes the blind rivet element such that it is secured against being pressed out and/or against turning in the workpiece. However, it is disadvantageous that a subsequent separation of a conventional rivet joint can only be realized with a substantial labor input and by destroying the rivet joint.

It is also known to use blind rivet nuts that operate in accordance with the spindle stroke principle. Such a blind rivet nut features an internal thread, into which a screw element forming the tension mandrel is screwed. Analogous to the above-described blind rivet element, the rivet sleeve section is deformed by screwing in the screw element so as to form a rivet collar that thereby comes in contact with the respective workpiece.

SUMMARY OF THE INVENTION

Based on these prior methods, the invention aims to disclose an improved rivet joint arrangement that can be subsequently separated, as well as easily, quickly and cost-efficiently produced, preferably in one production step during the course of an automated manufacturing process. This objective is attained with a rivet joint arrangement using a rivet element for producing a rivet joint between at least two workpieces, and more particularly between at least two sheet metal components, as well as to a corresponding method for its production.

A fundamental aspect of the inventive rivet joint arrangement is that the rivet flange is separably connected to the rivet element directly or separably connected to the rivet element via a sleeve element. This advantageously makes it possible to subsequently separate the produced rivet joint, for example, for repair or maintenance purposes without having to destroy the rivet joint arrangement. In fact, the rivet joint arrangement can also be restored after its separation.

It is furthermore advantageous that the rivet flange is formed by a nut element that can be screwed onto a first free end of the rivet element or onto the sleeve element. The screw-on nut element preferably features an internal thread that can be screwed onto the first free end of the rivet element or onto the sleeve element. In one embodiment, the screw-on nut element is realized in the form of a self-cutting or captive nut element.

In an alternative embodiment, the rivet element may feature a connecting section with an external thread for screwing on the nut element in the region of the first free end or the sleeve element may feature a hollow-cylindrical sleeve wall with an external thread for screwing on the nut element. It is particularly advantageous that the joint can be quickly and easily separated and restored due to the design of the rivet flange in the form of a nut element. Furthermore, the nut element also makes it possible to respectively introduce a prestress or individually adjust an existing prestress after the rivet joint has been produced.

The rivet element may be advantageously formed by a blind rivet element, a blind rivet nut element or a blind rivet screw element. The blind rivet element features an integrated tension mandrel element with a tension mandrel head and an adjacent tension mandrel shaft. In addition, the blind rivet element comprises a connecting section with the shape of a hollow cylinder or hollow rivet or with an annular shape, wherein the connecting sections may, for example, have a polygonal cross section, preferably a hexagonal cross section, or a round cross section.

In another advantageous embodiment, the rivet shaft section and the adjacent connecting section have the same diameter or the diameter of the connecting section is greater than the diameter of the rivet shaft section. In addition, the first workpiece features a first preliminary hole and the second workpiece features a second preliminary hole. The diameter of the first preliminary hole is equal to or greater than the diameter of the second preliminary hole. In this context, it is particularly preferred that the diameter of the first preliminary hole is adapted to the diameter of the connecting section or the diameter of the sleeve section and that the diameter of the second preliminary hole is adapted to the diameter of the rivet shaft section. In this way, a direct rivet joint can also be produced between the rivet element and the second workpiece such that the rivet joint arrangement is also captively held thereon after the nut element has been unscrewed.

In an advantageous enhancement of the invention, the cross section of the first and/or the second preliminary hole is adapted to the cross-sectional shape of the rivet element, particularly the cross-sectional shape of its connecting section. For example, the first and/or the second preliminary hole have a circular, round, oval or polygonal cross section, preferably a hexagonal cross section.

It is furthermore advantageous that the rivet element features a profiling or knurling on its outer side, preferably in the region of the rivet shaft section.

The sleeve element furthermore is in a longitudinal section advantageously realized in a U-shaped fashion and features a through-bore on the face, as well as a sleeve wall extending concentric to the longitudinal axis. In this case, the inside diameter included by the sleeve wall preferably is chosen greater than the diameter of the through-bore.

The nut element advantageously makes it possible to act upon the rivet joint arrangement with a prestressing force that can be adjusted by the nut element.

The blind rivet nut element features at least one nut section with an internal thread adjacent to the rivet shaft section and comprises a tension screw element with a tension screw head and a tension screw shaft that features an external thread, onto which the nut element can be screwed.

The invention likewise pertains to a method for producing a rivet joint arrangement according to one of the preceding claims comprising a rivet element and at least two workpieces to be connected, wherein the rivet element features a rivet shaft section that is at least sectionally realized in the form of a hollow rivet, as well as a rivet flange arranged adjacent thereto along the longitudinal axis of the rivet element. At least one first and second preliminary hole is advantageously produced in the workpieces to be connected and the rivet flange is separably connected to the rivet element directly or separably connected to the rivet element via a sleeve element. Subsequently, the thusly prepared rivet element is at least sectionally inserted into the aligned preliminary holes and the rivet shaft section is deformed into a rivet collar such that the two workpieces are clamped between the rivet collar and the rivet flange. It is particularly advantageous that the nut element simply has to be unscrewed from the rivet element or the sleeve element in order to separate the rivet joint arrangement. It is furthermore advantageous that a prestress can be introduced into the rivet joint arrangement by the rivet flange formed by a screw-on nut element.

The invention furthermore pertains to a blind rivet element and a blind rivet nut element suitable for use in an inventive rivet joint arrangement, wherein the elements respectively feature a connecting section with an external thread for screwing on a nut element that forms the rivet flange.

In the context of the invention, the terms "approximately," "essentially" or "about" refer to deviations from the respective exact value by +/−10%, preferably by +/−5%, and/or to deviations in the form of changes that are inconsequential to the function.

Enhancements, advantages and potential applications of the invention also result from the following description of exemplary embodiments and the figures. In this respect, all described and/or graphically illustrated characteristics basically form an object of the invention.

BRIEF DESCRIPTION OF THE DRAWINGS

The invention is described in greater detail below with reference to exemplary embodiments illustrated in the figures. In these figures:

FIG. 5 shows a schematic longitudinal section through another alternative embodiment of an inventive rivet joint arrangement with a rivet element in the form of a stepped blind rivet element, FIG. 6 shows a schematic longitudinal section through the rivet joint arrangement according to FIG. 5 after the rivet joint has been produced, FIG. 7 shows a schematic longitudinal section through another alternative embodiment of an inventive rivet joint arrangement with a rivet element in the form of a blind rivet screw element, FIG. 8 shows a schematic longitudinal section through the rivet joint arrangement according to FIG. 7 after the rivet joint has been produced.

DETAILED DESCRIPTION OF THE INVENTION

Figure 1:
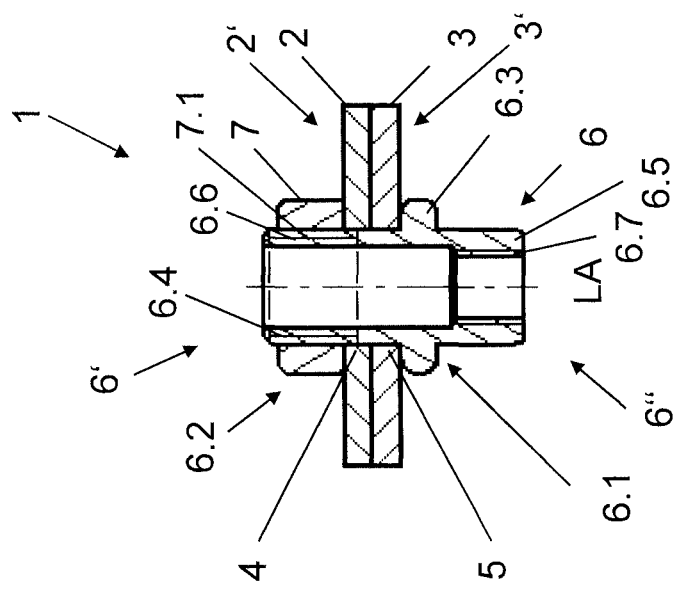
FIG. 1 shows a schematic longitudinal section through an inventive rivet joint arrangement.

FIG. 1 shows a schematic longitudinal section through an exemplary inventive rivet joint arrangement 1 for producing a rivet joint between two workpieces 2, 3 such as, for example, two sheet metal components or similar components, particularly metal components.

In the figures described below, these workpieces 2, 3 respectively are only schematically indicated in the form of two abutting, preferably plane contact sections of the workpieces 2, 3, namely a first contact section 2' of the first workpiece or metal component 2 and a second contact section 3' of the second workpiece or metal component 3 abutting thereon. In order to produce the rivet joint arrangement 1, aligned preliminary holes 4, 5 are initially produced in the abutting contact sections 2', 3' of the workpieces 2, 3, namely a first preliminary hole 4 in the first workpiece or metal component 2 and a second preliminary hole 5 in the second workpiece or metal component 3, wherein the rivet joint between the two workpieces or metal components 2, 3 is produced by means of these preliminary holes.

Depending on the respective embodiment, the first and the second preliminary holes 4, 5 may have the same or a different diameter and/or the same or a different cross-sectional shape, wherein the center axes of the first and the second preliminary holes 4, 5 respectively coincide regardless of their diameter or cross-sectional shape. The preliminary holes 4, 5 preferably have a round or polygonal cross section.

The inventive rivet joint arrangement 1 extends along a longitudinal axis LA that is preferably oriented perpendicular to the contact sections 2', 3' and coincides with the center axes of the preliminary holes 4, 5. For this purpose, the rivet joint arrangement 1 features at least one rivet element 6 with a rivet shaft section 6.1 that is at least sectionally realized in the form of a hollow rivet and a rivet flange 6.2 that is arranged adjacent to the rivet shaft section along the longitudinal axis LA of the rivet element 6 and preferably located in the region of a first free end 6' of the rivet element 6. Depending on the respective embodiment, the opposite second free end 6" of the rivet element 6 may be designed differently as described in greater detail further below. As will be appreciated based upon the following disclosure, the rivet element may take the form of Depending on the respective design of the rivet element 6 in the form of a blind rivet element 6a, 6b, 6d (see FIGS. 3-8), a blind rivet nut element (see FIGS. 1 and 2) or a blind rivet screw element 6c (see FIGS. 9 and 10)

In order to produce the rivet joint, the rivet element 6 is inserted through the preliminary holes 4, 5 with at least the rivet shaft section 6.1 such that it is supported on one of the contact sections 2', 3', namely on the first contact section 2' in the present exemplary embodiment, with the rivet flange 6.2 arranged in the region of the first free end 6'. Subsequently, the rivet shaft section 6.1 of the rivet element 6 is conventionally deformed into a rivet collar 6.3. Depending on the respective design of the rivet element 6 in the form of the blind rivet element 6a, 6b, 6d (see FIGS. 3-8) or the blind rivet nut element 6 or the blind rivet screw element 6c (see FIGS. 9 and 10), the deformation of the rivet shaft section 6.1 can be realized with different types of tension elements such as, for example, a tension mandrel element 8 (see FIGS. 5, 6, 9 and 10) or a tension screw element 9 (see FIGS. 7 and 8). The abutting contact sections 2', 3' of the workpieces 2, 3 are clamped between the rivet collar 6.3 formed during the riveting operation and the rivet flange 6.2. In this context, it is disadvantageous that the rivet flange 6.2 is in conventional rivet joint arrangements either realized integrally or in one piece with the rivet element 6 or rigidly connected thereto, i.e. the produced rivet joint can only be separated again by being destroyed. This is where the invention comes into play.

In order to create a rivet joint arrangement 1, 1a-1d that also can be separated after the rivet joint has been produced, the rivet flange 6.2, 6.2a-6.2d is, according to the invention, separably connected to the rivet element 6, 6a, 6b, 6c or separably connected to the rivet element 6d via a sleeve element 10. That is, the rivet element 6 is composed of multiple parts, preferably at least two parts, and therefore features at least one first part, which forms the base body of the rivet element 6 and comprises the rivet shaft section 6.1 that is at least sectionally realized in the form of a hollow rivet, and at least one second part, which can be separably connected to the rivet element 6, 6a-6d and forms the rivet flange 6.2. The separable rivet flange 6.2, 6.2a-6.2d is preferably formed by a nut element 7, 7a-7d that, in particular, also makes it possible to introduce a prestress into the rivet joint arrangement 1, 1a-1d, i.e. the prestressing force can be advantageously adjusted after the rivet joint has been produced by loosening or tightening the nut element 7, 7a-7d accordingly.

Figure 2:
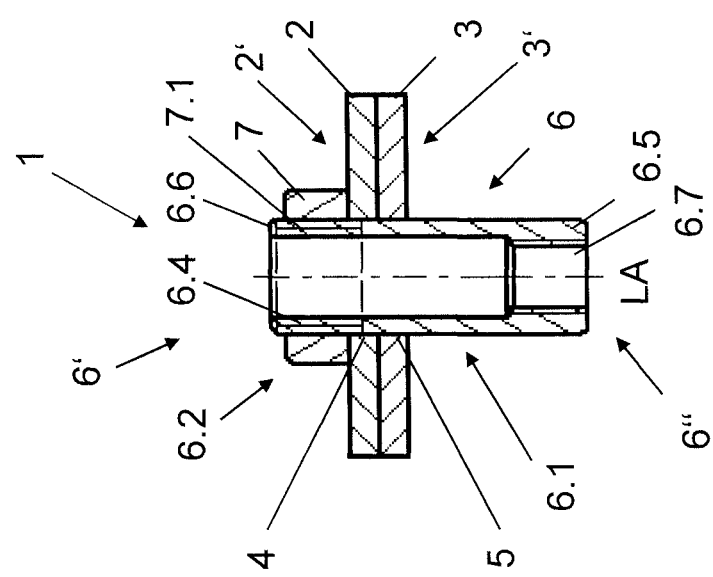
FIG. 2 shows a schematic longitudinal section through the inventive rivet joint arrangement according to FIG. 1 after the rivet joint has been produced.

A first exemplary embodiment of the inventive rivet joint arrangement 1 is illustrated in FIGS. 1 and 2 in the form of schematic sectional drawings. The rivet element 6 is formed by a blind rivet nut element that on a first free end 6' is separably connected to a nut element 7 forming the rivet flange 6.2. For this purpose, the blind rivet nut element 6 features a hollow-cylindrical connecting section 6.6 that is arranged adjacent to the rivet shaft section 6.1 along the longitudinal axis LA and designed for accommodating the separably designed rivet flange 6.2 or the nut element 7, respectively. In the first embodiment, the nut element 7 features for this purpose an internal thread 7.1 that can be screwed onto an external thread 6.4 provided in the region of the connecting section 6.6 of the blind rivet nut element 6. The nut element 7 may alternatively be realized in the form of a self-cutting or captive nut element that likewise is separably connected to the connecting section 6.6 on the first free end 6', namely without requiring a special external thread 6.4 for this purpose.

FIG. 1 shows the blind rivet nut element 6 inserted into the preliminary holes 4, 5 with a nut element 7 that is separably fixed on the first free end 6' or on the hollow-cylindrical connecting section 6.6, respectively, wherein the nut element 7 is screwed onto the external thread 6.4 of the blind rivet nut element 6 with its internal thread 7.1. The rivet shaft section 6.1 preferably is arranged directly adjacent to the connecting section 6.6 of the blind rivet nut element 6, wherein a nut section 6.5, which forms the second free end 6" of the blind rivet nut element 6 and features an internal thread 6.7, is in turn arranged adjacent to the rivet shaft section along the longitudinal axis LA.

After the insertion into the preliminary holes 4, 5, the blind rivet nut element 6 is supported on the first contact section 2' of the first workpiece 2 with the nut element 7. In order to produce the rivet joint, a tension means formed, for example, by a screw element (not illustrated in the figures) is respectively screwed into the blind rivet nut element 6 or the internal thread 6.7 of the nut section 6.5 provided on the second free end 6", wherein the head of the screw element, which is not illustrated in FIGS. 1 and 2, abuts on the face in the region of the first free end 6' of the rivet element 6 and the two opposite free ends 6', 6" of the blind rivet nut element 6 are tensioned relative to one another by the shaft of the screw element such that the rivet shaft section 6.1 is correspondingly deformed into the rivet collar 6.3 illustrated, for example, in FIG. 2 as the screw element is screwed in further. In this case, the rivet collar 6.3 forms a bead-shaped or annular contact section that concentrically extends around the longitudinal axis.

After the deformation of the rivet shaft section 6.1 into the rivet collar 6.3, the workpieces 2, 3 are clamped between the rivet collar 6.3 and the nut element 7 screwed onto the connecting section 6.6, i.e. the rivet joint has been produced. Subsequently, the screw element is once again screwed out of the blind rivet nut element 6, particularly the nut section 6.5, and removed from the rivet joint arrangement 1. This rivet joint arrangement 1 can be advantageously separated again by correspondingly loosening the screw connection between the nut element 7 and the blind rivet nut element 6.

Figure 3:
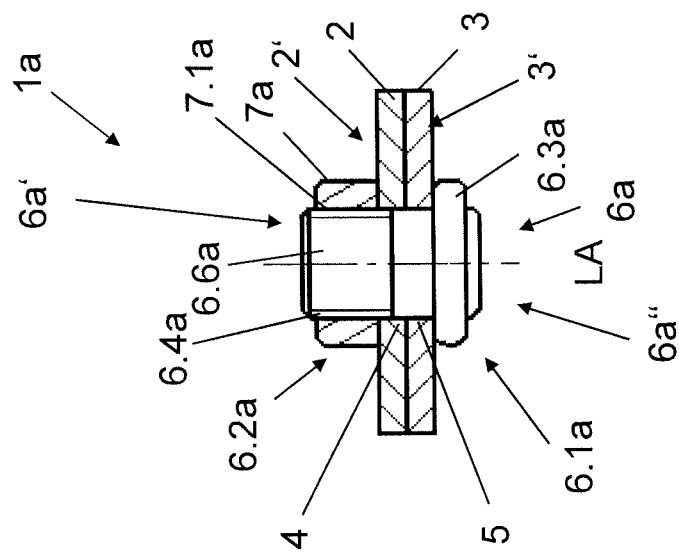
FIG. 3 shows a schematic longitudinal section through an alternative embodiment of an inventive rivet joint arrangement with a rivet element in the form of a blind rivet element.
Figure 4:
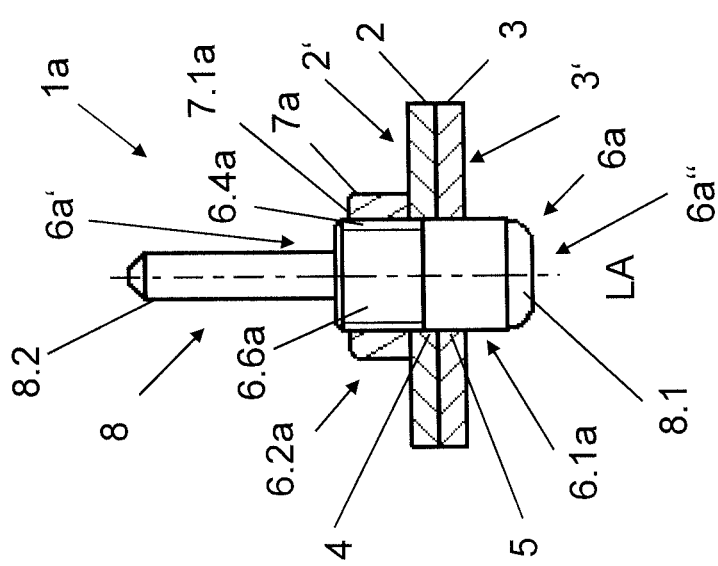
FIG. 4 shows a schematic longitudinal section through the rivet joint arrangement according to FIG. 3 after the rivet joint has been produced.

FIGS. 3 and 4 show an alternative embodiment of an inventive rivet joint arrangement 1a, namely once again in the separated or not yet riveted state (FIG. 3) and in the riveted state (FIG. 4). In this embodiment, the rivet element 6 is realized in the form of a blind rivet element 6a with an integrated tension mandrel element 8 that extends through the rivet shaft section 6.1a. The blind rivet element 6a has a shorter length along the longitudinal axis LA than the blind rivet nut element 6 according to FIGS. 1 and 2. A hollow-cylindrical connecting section 6.6a forming the first free end 6a' of the blind rivet element 6a is once again arranged adjacent to the rivet shaft section 6.1a. The tension mandrel element 8 features a tension mandrel head 8.1 and an adjacent oblong tension mandrel shaft 8.2. The tension mandrel head 8.1 respectively abuts on the second free end 6a" of the blind rivet element 6a or the rivet shaft section 6.1a. The tension mandrel shaft 8.2 extends outward over the entire length of the blind rivet element 6a beyond the first free end 6a' of the rivet element 6a and therefore protrudes from the first free end 6a' of the rivet element 6a along the longitudinal axis LA.

According to the invention, the rivet flange 6.2a of the blind rivet element 6a is in the region of the first free end 6a' formed by a nut element 7a that is separably connected to the rivet element 6*a*, namely to its connecting section 6.6*a*. In the embodiment shown, the nut element 7*a* once again features an internal thread 7.1*a* that is screwed onto an external thread 6.4*a* provided on the connecting section 6.6*a* of the blind rivet element 6*a*. According to FIG. 3, the blind rivet element 6*a* with the integrated tension mandrel element 8 is inserted into the preliminary holes 4, 5 such that the nut element 7*a* comes in contact with the contact section 2' of the first workpiece 2. Subsequently, the rivet shaft section 6.1*a* arranged adjacent to the tension mandrel head 8.1 is deformed into the rivet collar 6.3*a* by conventionally actuating the tension mandrel element 8, namely by pulling the tension mandrel shaft 8.2 along the longitudinal axis LA, such that the desired clamping effect of the inventive rivet joint arrangement 1*a* is produced.

FIG. 4 shows the rivet joint arrangement 1*a* after the rivet joint has been produced and the tension mandrel shaft 8.2 has been at least partially removed, for example, by being broken along a predetermined breaking line (not illustrated in the figures) provided for this purpose. In this case, the produced rivet joint arrangement 1*a* can also be subsequently separated again by loosening the screw connection between the nut element 7*a* and the blind rivet element 6*a*.

FIGS. 5 and 6 show another alternative embodiment of an inventive rivet joint arrangement 1*b*, in which the rivet element 6 is realized in the form of a blind rivet element 6*b* with an integrated tension mandrel element 8. The blind rivet element 6*b* once again features at least one rivet shaft section 6.1*b* and a hollow-cylindrical connecting section 6.6*b* arranged adjacent thereto along the longitudinal axis LA. The hollow-cylindrical connecting section 6.6*b* has a greater diameter than the rivet shaft section 6.1*b* such that a stepped transition is formed between the rivet shaft section 6.1*b* and the connecting section 6.6*b*. The rivet shaft section 6.1*b*, as well as the connecting section 6.6*b*, is preferably realized in the form of a hollow rivet section. The connecting section 6.6*b* features an external thread 6.4*b*, onto which the nut element 7*b* forming the rivet flange 6.2*b* can be screwed.

The first preliminary hole 4 is advantageously designed for accommodating the connecting section 6.6*b*, i.e. its diameter corresponds at least to the diameter of the connecting section 6.6*b*. The diameter of the second preliminary hole 5 is adapted to the diameter of the rivet shaft section 6.1*b* and therefore chosen smaller than the diameter of the first preliminary hole 4. In this way, a stepped passage, which essentially corresponds to the stepped transition between the rivet shaft section 6.1*b* and the connecting section 6.6*b*, is formed between the aligned preliminary holes 4, 5. The blind rivet element 6*b* therefore rests and is supported on the second workpiece 3 or its contact section 3', respectively, with the annular contact section of the connecting element 6.6*b* being formed. The adjacent rivet shaft section 6.1*b* extends through the second preliminary hole 5 and respectively protrudes from the underside of the second workpiece 3 or its contact section 3' along the longitudinal axis LA as already illustrated in FIGS. 4 and 5.

According to the invention, the rivet flange 6.2*b* is on the first free end 6*b*' of the blind rivet element 6*b* once again formed by a nut element 7*b* that is separably connected to the connecting section 6.6*b*. In the embodiment shown, the nut element 7*b* once again features an internal thread 7.1*b* that is screwed onto an external thread 6.4*b* provided on the connecting section 6.6*b* of the blind rivet element 6*b*.

According to FIG. 5, the blind rivet element 6*b* is inserted into the two preliminary holes 4, 5 in the above-described fashion such that the nut element 7*b* comes in contact with the contact section 2' of the first workpiece 2. The rivet shaft section 6.1*b* arranged adjacent to the tension mandrel head 8.1 is then deformed into the rivet collar 6.3*b* by conventionally actuating the tension mandrel element 8, namely by pulling the tension mandrel shaft 8.2 along the longitudinal axis LA, such that a "double" clamping effect is produced due to the fact that the second contact section 3' of the second workpiece 3 is on the one hand clamped between the annular contact section of the connecting section 6.6*b* and the rivet collar 6.3*b* being formed and the first contact section 2' of the first workpiece 2 is on the other hand clamped between the rivet collar 6.3*b* and the nut element 7*b*. In this alternative rivet joint arrangement 1*b*, the rivet joint between the workpieces 2, 3 can be advantageously separated by unscrewing the nut element 7*b*, wherein the blind rivet element 6*b* is captively held on the second workpiece 3 due to the still existing rivet joint with the second workpiece 3.

FIG. 6 shows the rivet joint arrangement 1*b* according to FIG. 5 after the rivet joint has been produced, namely after the tension mandrel shaft 8.2 has been at least partially removed.

In addition, FIGS. 7 and 8 show another embodiment of an inventive rivet joint arrangement 1*c*, in which the rivet element 6 is formed by a blind rivet screw 6*c*. The blind rivet screw 6*c* has a first and a second free end 6*c*', 6*c*" and extends along the longitudinal axis LA. The rivet shaft section 6.1*c* is arranged adjacent to the first free end 6*c*' and followed by a connecting section 6.6*c* that features a through-bore and therefore is realized in a sleeve-like fashion, wherein the connecting section forms the second free end 6*c*" of the blind rivet screw 6*c*. A tension screw element 9 with a tension screw head 9.1 and an adjacent tension screw shaft 9.2 extends through the connecting section 6.6*c* and the rivet shaft section 6.1*c*. The tension screw element 9 features an external thread 9.3 at least on its free end 9' of the tension screw shaft 9.2 that lies opposite of the tension screw head 9.1. The external thread 9.3 is designed for accommodating a nut element 7*c* that forms the rivet flange 6.2*c* of the rivet joint arrangement 1*c*.

Prior to the installation of the blind rivet screw 6*c*, the nut element 7*c* is screwed onto the free end 9' of the tension screw shaft 9.2, namely until it abuts on the first free end 6*c*' of the blind rivet screw 6*c*. The thusly prepared blind rivet screw 6*c* is inserted into the two preliminary holes 4, 5 in the workpieces 2, 3 until the nut element 7*c* comes in contact with the first contact section 2' of the first workpiece 2. FIG. 7 shows an example of a blind rivet screw 6*c* that is thusly inserted into the preliminary holes 4, 5.

In order to produce the rivet joint, the tension screw element 9 is now turned about the longitudinal axis LA such that the first and the second free end 6*c*', 6*c*" of the blind rivet screw 6*c* are tensioned relative to one another and the rivet shaft section 6.1*c* is deformed into the rivet collar 6.3 as illustrated in FIG. 8. The two workpieces 2, 3 are now clamped between the rivet collar 6.3 of the blind rivet screw 6*c* being formed and the nut element 7*c*. The produced rivet joint can be separated again by unscrewing the nut element 7*c* from the screw 9. In addition, a prestress can also be introduced into the rivet joint arrangement 1*c* by tightening or loosening the nut element 7*c* accordingly.

Figure 10:
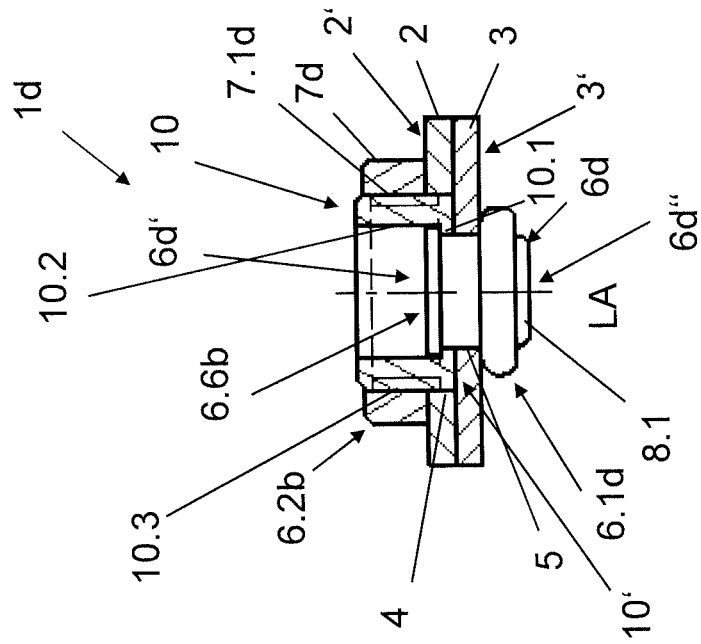
FIG. 10 shows a schematic longitudinal section through the rivet joint arrangement according to FIG. 9 after the rivet joint has been produced.
Figure 9:
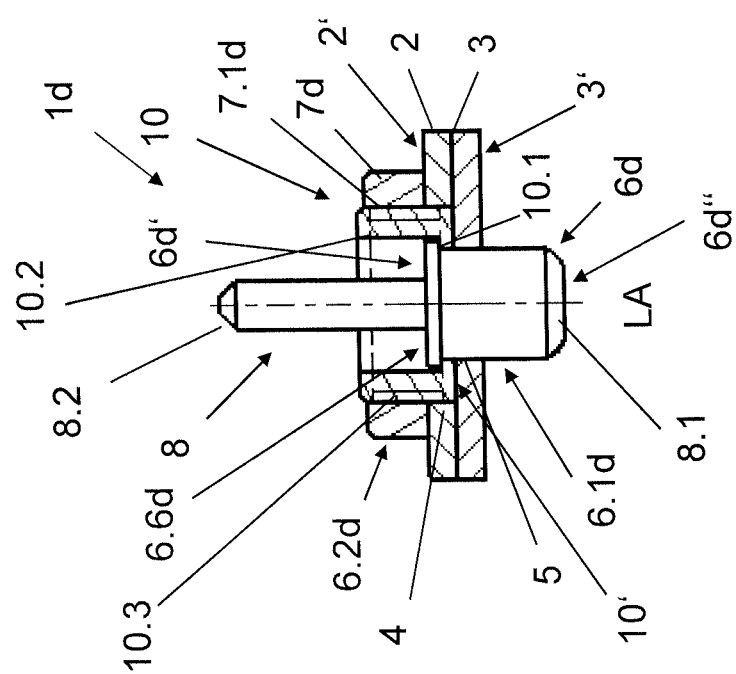
FIG. 9 shows a schematic longitudinal section through an alternative embodiment of an inventive rivet joint arrangement with a rivet element in the form of a blind rivet element and a sleeve element.

FIGS. 9 and 10 ultimately show yet another embodiment of an inventive rivet joint arrangement 9*d*, in which the rivet element 6 is realized in the form of a blind rivet element 6*d* with an integrated tension mandrel element 8. The rivet shaft section 6.1*d* is arranged adjacent to the tension mandrel head 8.1 and followed by a connecting section 6.6*d* with annular cross section, the diameter of which is greater than the diameter of the rivet shaft section 6.1d. The tension mandrel shaft 8.2 extends along the longitudinal axis LA beyond the annular connecting section 6.6d and therefore protrudes outward from this connecting section along the longitudinal axis LA. The blind rivet element 6d once again features two opposite free ends 6d', 6d", wherein a first end 6d' is arranged adjacent to the tension mandrel head 8.1 and the second free end 6d" is formed by the annular connecting section 6.6d.

Furthermore, a sleeve element 10, which in a longitudinal section is realized in a U-shaped fashion, is provided and features a through-bore 10.1 on the face and a cylindrical sleeve wall 10.2 with an external thread 10.3. The through-bore 10.1 of the sleeve element 10 provided on the end face 10' of the sleeve element 10 is dimensioned in such a way that the rivet shaft section 6.1d can be inserted therein, but the connecting section 6.6d comes in contact within the cylindrical sleeve wall 10.2 due to its enlarged diameter.

According to FIG. 9, the sleeve element 10 is attached onto the rivet shaft section 6.1d from the second free end 6d" of the blind rivet element 6d with the sleeve wall 10.2 pointing forward until it comes in contact with the annular contact section 6.6d of the blind rivet element 6d. The cylindrical sleeve wall 10.2 concentrically surrounds the longitudinal axis LA and extends at least sectionally along the tension mandrel shaft 8.2. A nut element 7d forming the rivet flange 6.2d of the rivet joint arrangement 9d is screwed onto the external thread 10.3 of the cylindrical sleeve wall 10.2.

In order to ensure a captive connection of the sleeve element 10 on the second workpiece 3, the first and the second preliminary hole 4, 5 are analogous to the embodiment according to FIGS. 5 and 6 realized with different diameters, wherein the diameter of the first preliminary hole 4 is greater than the diameter of the second preliminary hole 5. This once again results in a stepped passage such that the annular end face 10' of the sleeve element 10 featuring the through-bore 10.1 comes in contact with the second contact section 3' of the second workpiece 3 released by the first through-bore 4. The annular end face 10' of the sleeve element 10 therefore is supported on the second workpiece 3 as illustrated in FIGS. 9 and 10.

The rivet shaft section 6.1d arranged adjacent to the tension mandrel head 8.1 is deformed into the rivet collar 6.3d by conventionally actuating the tension mandrel element 8, namely by pulling the tension mandrel shaft 8.2 along the longitudinal axis LA, and a "double" clamping effect is thereby once again produced. The second contact section 3' of the second workpiece 3 is clamped between the annular end face 10' of the sleeve element 10 and the rivet collar 6.3d being formed and the first contact section 2' of the first workpiece 2 is clamped between the rivet collar 6.3d and the nut element 7d. In this additional alternative rivet joint arrangement 1d, the rivet joint between the workpieces 2, 3 can be advantageously separated by unscrewing the nut element 7d, wherein the blind rivet element 6d is captively held on the second workpiece 3 due to the still existing clamping connection produced by the sleeve element 10.

FIG. 10 shows the rivet joint arrangement 1d according to FIG. 9 after the rivet joint has been produced, namely after the tension mandrel shaft 8.2 has been at least partially removed.

The connecting section 6.6, 6.6a-6.6c of the respective rivet element 6, 6a, 6b, 6c or the sleeve element 10 also may at least in the connecting region with the workpieces 2, 3 have a polygonal cross section, preferably a hexagonal cross section, such that it can be respectively accommodated in the preliminary holes 4, 5 in a rotationally secured fashion.

The cross section of the first and/or the second preliminary hole(s) 4, 5 may also be adapted to the cross-sectional shape of the respective rivet element 6, 6a-6d, particularly the cross-sectional shape of its connecting section 6.6a, 6.6b, 6.6d. For example, the first and/or the second preliminary hole(s) 4, 5 may have a circular, round, oval or polygonal cross section, preferably a hexagonal cross section.

In an embodiment that is not illustrated in the figures, the respective rivet element 6, 6a-6d is provided with a profiling or knurling on its outer side, preferably in the region of the rivet shaft section 6.1, 6.1a-6.1d.

The invention furthermore pertains to a method for producing an inventive rivet joint arrangement 1, 1a-d, according to which aligned preliminary holes 4, 5 are initially produced in the workpieces 2, 3 to be connected to one another. Subsequently, the respective rivet element 6, 6a, 6b, 6c or the sleeve element 10 is separably connected to the nut element 7, 7a-7d forming the rivet flange 6.2, 6.2a-6.2d and inserted into the preliminary holes 4, 5 in the thusly prepared fashion, namely until the nut element 7, 7a-7d that, according to the invention, is separably arranged on the rivet element 6, 6a, 6b, 6c or the sleeve element 10 comes in contact with one of the workpieces 2, 3. The rivet joint is then produced by deforming the respective rivet shaft section 6.1, 6.1a-6.1d due to the actuation of the tension means, particularly the tension mandrel element 8 or a corresponding tension mandrel screw element 9. The inventive separable rivet joint can be advantageously produced in one production step and a predefined prestress can be additionally introduced into the rivet joint arrangement. This is particularly advantageous in the industrial preassembly or final assembly of metal components 2, 3.

The invention was described above with reference to exemplary embodiments. However, it goes without saying that numerous changes and modifications are possible without thereby deviating from the object of the present invention.

REFERENCE LIST 1, 1a, 1b, 1c, 1d Rivet joint arrangement
2 First workpiece or metal component
2' First contact section
3 Second workpiece or metal component
3' Second contact section
4 First preliminary hole
5 Second preliminary hole
6 Rivet element, blind rivet nut element
6', 6a', 6b', 6c', 6d' First free end
6", 6a", 6h", 6c", 6d" Second free end
6a, 6b, 6d Blind rivet element
6c Blind rivet screw element
6.1, 6.1a-6.1d Rivet shaft section
6.2, 6.2a-6.2d Rivet flange
6.3, 6.3a-6.3d Rivet collar
6.4, 6.4a, 6.4b External thread
6.5 Nut section
6.6, 6.6a-6.6d Connecting section
6.7 Internal thread
7, 7a, 7b, 7c, 7d Nut element
7.1, 7.1a-7.1d Internal thread
8 Tension mandrel element
8.1 Tension mandrel head
8.2 Tension mandrel shaft 9 Tension screw element
9.1 Tension screw head
9.2 Tension screw shaft
9.3 External thread
10 Sleeve element
10' End face
10.1 Through-bore
10.2 Sleeve wall
10.3 External thread
LA Longitudinal axis

What is claimed is:

1. A rivet joint arrangement comprising:
a rivet element and at least two workpieces jointed via a rivet joint, wherein the rivet element is composed of at least two parts and comprises a rivet shaft section, configured at least within sections in a form of a hollow rivet, and a rivet flange arranged adjacent thereto along a longitudinal axis (LA) of the rivet element, the rivet flange is formed by a nut element, and wherein the rivet joint includes at least parts of a rivet shaft section inserted into two preliminary holes in the at least two workpieces, the rivet shaft section is deformed into a rivet collar and the at least two workpieces are clamped between the rivet collar and the rivet flange, wherein the rivet element is in the form of a blind rivet nut element with a first free end and a second free end, and wherein the nut element forming the rivet flange is separably connected directly to the first free end of the rivet element and the blind rivet nut element comprises a nut section with an internal thread at the second free end of the rivet element, and wherein the rivet flange is formed by a screw-on nut element that is screwed onto a first free end of the rivet element.

2. The rivet joint arrangement according to claim 1, wherein the screw-on nut element includes an internal thread that is screwed onto the first free end of the rivet element.

3. The rivet joint arrangement according to claim 1, wherein the screw-on nut element is a self-cutting or captive nut element.

4. The rivet joint arrangement according to claim 1, wherein the rivet element includes, in the region of the first free end, a connecting section with an external thread for screwing on the screw-on nut element.

5. The rivet joint arrangement according to claim 4, wherein the rivet shaft section and the adjacent connecting section have a same diameter or that a diameter of the connecting section is greater than a diameter of the rivet shaft section.

6. The rivet joint arrangement according to claim 1, wherein the blind rivet element includes a connecting section in a shape of a hollow cylinder, or a hollow rivet, or an annular shape.

7. The rivet joint arrangement according to claim 6, wherein the connecting section has a polygonal cross section.

8. The rivet joint arrangement according to claim 1, wherein a first workpiece of the at least two workpieces includes a first preliminary hole and the second workpiece of the at least two workpieces includes a second preliminary hole, and a diameter of the first preliminary hole is equal to or greater than a diameter of the second preliminary hole.

9. The rivet joint arrangement according to claim 8, wherein the diameter of the first preliminary hole is equal to a diameter of the connecting section or is equal to a diameter of the sleeve element.

10. The rivet joint arrangement according to claim 8, wherein the diameter of the second preliminary hole is adapted to a diameter of the rivet shaft section.

11. The rivet joint arrangement according to claim 8, wherein the cross section of the first and/or the second preliminary hole(s) is adapted to a cross-sectional shape of the rivet element.

12. The rivet joint arrangement according to claim 8, wherein the first and/or the second preliminary hole(s) has a circular, round, oval or polygonal cross section.

13. The rivet joint arrangement according to claim 8, wherein the rivet element includes a profiling or knurling on an outer side in a region of the rivet shaft section.

14. The rivet joint arrangement according to claim 13, wherein the prestressing force is adjusted by the nut element.

15. The rivet joint arrangement according to claim 1, wherein the rivet joint arrangement is acted upon with a prestressing force by a nut element.

16. The rivet joint arrangement according to claim 1, wherein the blind rivet nut element includes at least one nut section arranged adjacent to the rivet shaft section and includes an internal thread.

17. The rivet joint arrangement according to claim 1, wherein the blind rivet screw element includes a tension screw element with a tension screw head and a tension screw shaft with an external thread, onto which a nut element is screwed.

18. The rivet joint arrangement as claimed in claim 1, wherein the rivet flange is a prestressed rivet joint arrangement.

* * * * *